UNITED STATES PATENT OFFICE.

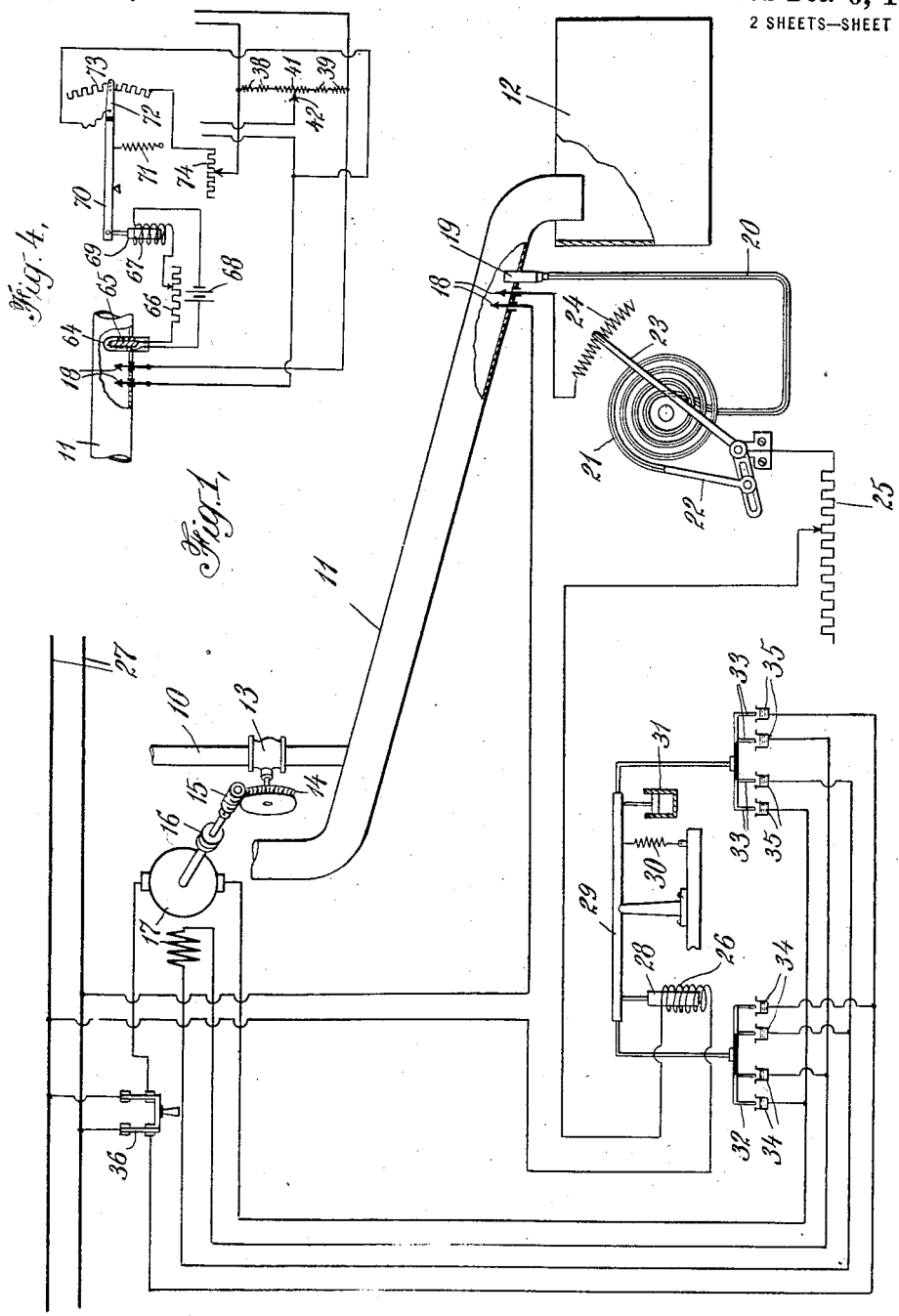

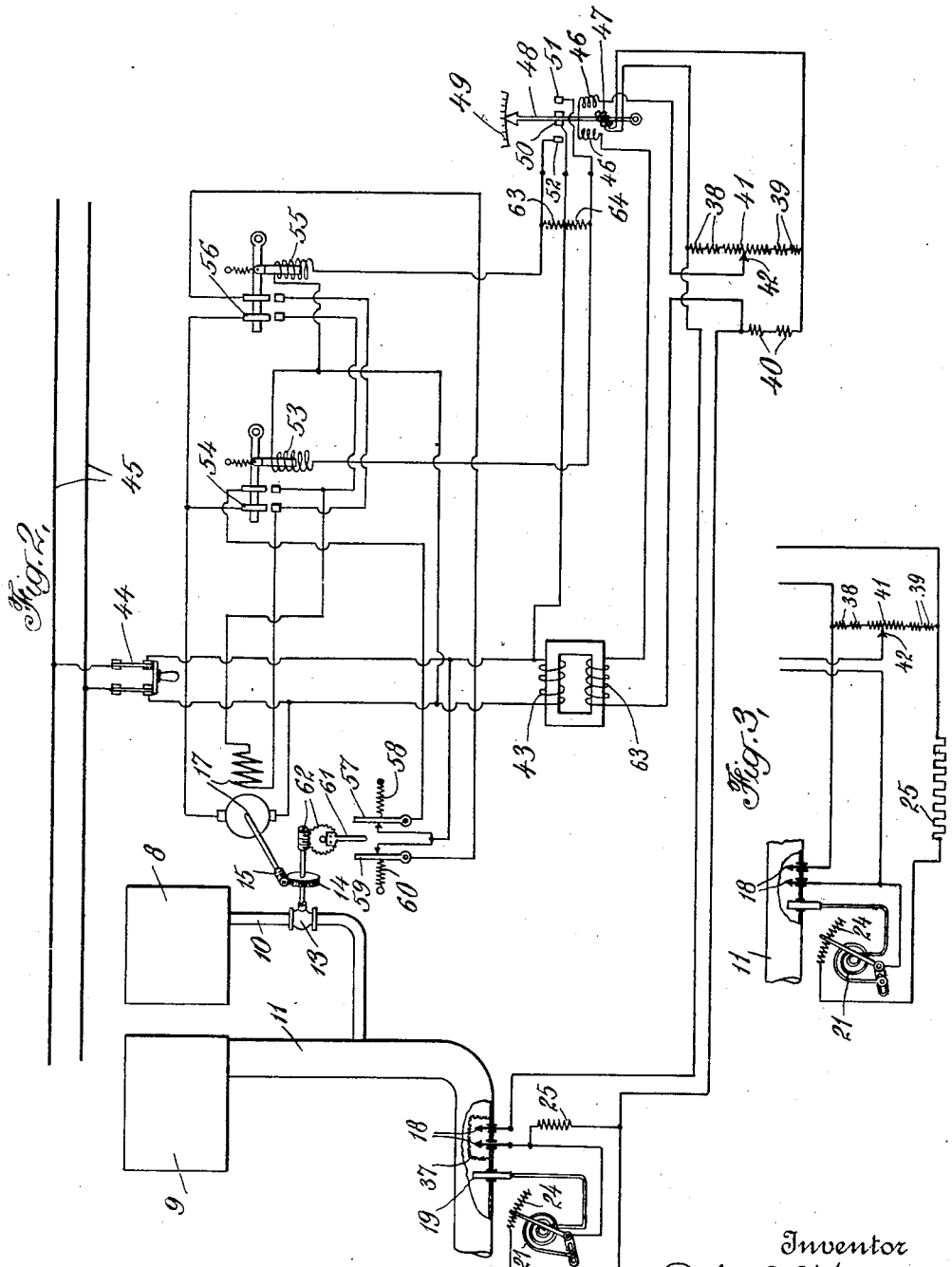

PHILIP E. EDELMAN, OF NEW YORK, N. Y.

CONTROL OF REACTIONS.

1,399,200.   Specification of Letters Patent.   Patented Dec. 6, 1921.

Application filed January 31, 1920. Serial No. 355,369.

*To all whom it may concern:*

Be it known that I, PHILIP E. EDELMAN, a citizen of the United States, residing at New York city, in the county of New York, State of New York, have invented certain new and useful Improvements in Control of Reactions; and I do hereby declare the following to be a full, clear, and exact description of the invention, such as will enable others skilled in the art to which it appertains to make and use the same.

This invention relates to the control, either manually or automatically, of treatment processes, such as reactions, mixes, and the like. More particularly, the invention relates to the control of such processes by actions responsive to changes in the electrical conductivity of an appropriate component of the treatment process. This component may be one of the reacting agents or reagents of the process or the end product thereof, and in general may be any initial, intermediate or final component of the treatment process whose characteristic curve of electrical conductivity can be made use of for indicating the state or condition of the process.

In substantially all chemical and allied industries, a predetermined desired change in the composition or properties of a material, or the formation of a predetermined desired product, is brought about as the consequence of the action of an appropriate agent or reagent upon the material, or of the action of two or more reagents upon one another. In such cases, it is desirable to control the uniformity of the reaction or process or of the end product. In my copending application for Letters Patent of the United States, Serial No. 344,756, filed December 13, 1919, there is described a method of controlling treatment processes in which use is made of the changes of electrical conductivity of an appropriate component of the process. Variations in temperature have a very pronounced effect upon the electrical conductivity of liquids and, in general, the conductivity increases with increase in temperature. In the control of treatment processes in response to changes in the electrical conductivity of liquids, accurate and satisfactory results can only be secured when some effective temperature compensating means is employed. In my aforementioned application, the desired temperature compensation is effected by balancing the portion of the material under test against a portion of similar material of known conductivity maintained at the same temperature as the material being tested. The present invention contemplates the provision of an improved method of and apparatus for effecting the desired temperature compensation of an action responsive to changes in the electrical conductivity of an appropriate component of a treatment process.

The present invention involves the use of a thermal responsive device for producing a mechanical action responsive to changes in the temperature of the component of the treatment process whose electrical conductivity is employed for effecting the desired control of the process. This thermal responsive action is then caused to effect the desired compensation for changes in the electrical conductivity of the component occasioned by changes in the temperature thereof.

In carrying out the invention, I have used with success as the thermal responsive device a mercury, gas or vapor pressure thermometer comprising a bulb and spiral spring filled respectively with mercury and an appropriate gas or vapor. The bulb is placed in thermal relation with the component of the process and is effected by the temperature thereof. A capillary tube connects the bulb with a hollow spring of spiral configuration which expands or contracts with temperature changes. This movement of the spiral spring is positive, stiff and sensitive and is communicated to a contact member adapted to move over a wire resistance of manganin, more or less of this resistance being cut in or out, according to the change in temperature. The variation of this resistance by changes in temperature may be employed in various electrical combinations for effecting the desired temperature compensation in the electrical conductivity of the component of the treatment process, as will be more fully explained hereinafter.

The novel features of the invention which I believe to be patentable are definitely set forth in the claims appended hereto. These features, together with the arrangement and mode of operation of a control equipment embodying the same, will be better understood from the following description taken in conjunction with the accompanying drawings, in which:

Figure 1 diagrammatically illustrates an automatic reaction control equipment embodying the invention;

Fig. 2 diagrammatically illustrates a modified control equipment embodying the invention; and Figs. 3 and 4 diagrammatically indicate further modifications of the invention.

Referring now to Fig. 1 of the drawings, there is diagrammatically represented a conduit or pipe 10 for supplying an agent or reagent of the treatment process to a conduit 11, which latter is supplied with a second agent or reagent of the process. The two agents mix in the conduit 11 below the junction of the pipe 10 therewith and the reaction is completed by the time the mixture reaches the lower end of the conduit 11, from whence the product is discharged into a storage container 12. The pipe 10 is provided with a control valve 13 having a worm gear 14 secured to the stem thereof. The worm gear 14 is adapted to be driven in either direction, thereby closing or opening the valve 13, by means of a worm 15 which is connected through a slip clutch 16 to the rotor of an electric motor 17. The apparatus just described is intended to be typical of treatment processes in general, and the specific arrangements of the various elements thereof are merely explanatory and are not intended as any limitation of the applications of the invention.

In the particular explanatory process illustrated in the accompanying drawings, the treatment process is controlled in response to changes in the electrical conductivity of the end product or mixture flowing through the lower end of the conduit 11. A pair of testing electrodes 18 insulatively project through the conduit 11, near the discharge end thereof, and are electrically associated with the liquid flowing through the conduit. The thermal responsive bulb 19 of a mercury or vapor pressure thermometer also projects into the conduit 11 in proximity to the testing electrodes 18. The bulb 19, containing the thermal responsive agent or actuating medium, such as mercury, is in communication with a capillary tube 20. The capillary tube 20 communicates with the inner end of a spiral spring 21 which also has a capillary opening throughout its entire length.

The capillary opening in the spiral spring 21 is closed at the outer end of this spring, and this end of the spring is connected by a linkage 22 with a movable contact member 23. An appropriate gas or vapor, such as air or ether vapor, is confined in the communicating capillary openings of the tube 20 and the spring 21. The contact member 23 passes over a resistance element 24, preferably of manganin wire. On an increase in temperature of the bulb 19, the spiral spring 21 tends to straighten out and in so doing actuates the contact member 23, thereby varying the point of engagement of the contact member with the resistance.

One terminal of the resistance 24 is electrically connected to one of the electrodes 18. The contact member 23 is electrically connected, through a resistance 25, with the energizing coil 26 of a solenoid. The electrical connections are such that the testing electrodes 18, the resistance 24, the resistance 25, and the energizing coil 26, are connected in series relation across an appropriate source of electric energy, such, for example, as the mains 27.

The plunger 28 of the solenoid is connected to one end of a pivoted balance arm 29. A spring 30 and dash pot 31 are connected to the other end of the balance arm. The balance arm carries at each end two pairs of metallic contacts, 32 and 33, respectively, coöperating with two pairs of mercury contacts 34 and 35, respectively. The coöperating pairs of contacts 32—34 and 33—35 serve to connect the electric motor 17 to the source of electric energy 27 for clockwise or counter-clockwise rotation depending upon which pairs of contacts are in engagement. The electric motor 17 is preferably of the series type, and its electrical connections as illustrated in Fig. 1 are such that its direction of rotation depends upon the direction of current flow in the field winding thereof. A switch 36 is preferably included in the connections of this motor with the current source 27.

The operation of the control equipment illustrated in Fig. 1 is as follows: As long as the desired uniformity of the treatment process is maintained, the electrical conductivity of the liquid between the testing electrodes 18 will remain constant and a predetermined constant current will flow through the energizing coil 26. The electro-magnetic action produced by this predetermined constant current flow is just neutralized by the spring 30, so that under these conditions the balance arm 29 remains horizontal and the metallic contacts 32 and 33 are held out of engagement with the coöperating mercury contacts 34 and 35 respectively. Upon a decrease in the electric conductivity of the fluid between the electrodes 18, the electro-magnetic effect of the energizing winding 26 is lowered and the spring 30 then depresses the metallic contacts 33 into engagement with the mercury contacts 35, whereupon the motor 17 drives the worm gear 14 to effect a certain adjustment of the valve 13 calculated to increase the conductivity of the fluid between the electrodes 18. Upon the resumption of normal conditions, the electro-magnetic action of winding 26 restores the balance arm 29 to its horizontal position, thereby raising the contacts 33 out of engagement with the contacts 35. Upon an increase in the conductivity of the fluid between the electrodes 18 the electro-magnetic action of the winding 26 overpowers the action of the spring 30 and the contacts 32 are lowered into engagement with the contacts 34, thereby effecting rotation of the motor 17 in the reverse direction with the corresponding movement of the valve 13 calculated to effect a decrease in the conductivity of the fluid between the electrodes 18. Thus, upon any change in the conductivity of the fluid between the electrodes 18, the control valve 13 is appropriately manipulated to effect the desired control of the treatment process so as to maintain uniformity.

The action produced in response to changes in the electrical conductivity of the fluid between the electrodes 18 is compensated for changes in the conductivity occasioned by changes in temperature of the fluid. Thus, the resistances 24 and 25 are so proportioned that changes in conductivity of the liquid between the electrodes 18 are exactly reproduced by corresponding changes in the conductivity of the variable resistance 24. Movement of the contact arm 23 over the resistance 24 in response to temperature changes of the fluid in the conduit 11 thus serves to effect the desired temperature compensation. The resistance 25, while shown as adjustable, may be a fixed resistance and its value is determined upon by suitable calibration. The auxiliary resistance 25 thus permits any desired temperature coefficient over any desired range of temperature to be duplicated.

In Fig. 2 of the drawings, the conduits 10 and 11 are diagrammatically represented in communication with storage receptacles 8 and 9 respectively. The control valve 13, the worm gear drive 15—14 and the motor 17 are arranged in substantially the same manner as described in connection with Fig. 1.

The testing electrodes 18 are protected by a screen shield 37. The thermally adjustable resistance 24 is electrically connected in series with the testing electrodes 18, and is shunted by the fixed resistance 25.

The combination formed by the testing electrodes 18 and the temperature compensating resistances 24 and 25 is connected as one arm of a Wheatstone bridge, of which the resistances 38, 39 and 40 form the other three arms. The resistances 38, 39 and 40 are preferably composed of a plurality of calibrated units which may be cut in and out, as desired. The resistances 38 and 39 are preferably connected by an intermediate resistance 41 having an adjustable contact 42 connected to the source of electric energy from which the bridge is energized.

In the apparatus diagrammatically represented in Fig. 2, the Wheatstone bridge arrangement is energized from the secondary winding 63 of a step down transformer whose primary winding 43 is adapted to be connected by a switch 44 to the main source of electric energy 45. The current which energizes the bridge also flows through the field windings 46 of an electrical instrument, which may be a contact-making voltmeter, ammeter, or the like. The moving element of this instrument carries a coil 47 which is connected across the bridge for indicating any unbalancing thereof occasioned by variations in the conductivity of the fluid between the testing electrodes 18.

The moving element or pointer 48 of the electrical measuring instrument may, if desired, sweep across an appropriate scale 49. This scale may be appropriately calibrated in terms or units of any desired characteristic concerned with the condition of the end product or any component of the treatment process. Thus, an operator may employ the observations obtained from the position of the pointer 48 on the scale 49 for manually, or otherwise, controlling the treatment process.

In the control equipment represented in Fig. 2 of the drawings, the action of the pointer 48 in response to variations in the electrical conductivity of the fluid between the electrodes 18 is employed to automatically effect the necessary control of the treatment process to secure the desired uniformity. Thus, the moving element or pointer 48 carries an electrical contact 50 which is electrically connected to the source of electric energy 45.

A pair of stationary contacts 51 and 52 are operatively arranged on opposite sides of the movable contact 50. The contact 51 is connected to one terminal of the energizing coil 53 of a solenoid-operated or electro-magnetic switch 54, and the contact 52 is connected to one terminal of the energizing coil 55 of a second solenoid-operated or electro-magnetic switch 56. The other terminals of the energizing coils 53 and 55 are connected together and to the electric energy supply source 45. If desired, relatively high resistance units 63 and 64 may be shunted across the contacts 50—52 and 50—51, respectively. The resistances 63 and 64 should be sufficiently great so that the current flowing therethrough is not sufficient to actuate the switches 54 and 56 when the contact 50 is disengaged from the contacts 51 or 52. By this arrangement, the current flow between the contact 50 and 51 or 52, as the case may be, is reduced and objectionable sparking at these contacts is prevented.

The switches 54 and 56 are connected to the terminals of the series electric motor 17. The armature and field windings of the motor 17 are so connected to the contacts of the switches 54 and 56 that the rotor of the motor revolves in one direction when switch 54 is closed and in the opposite direction when switch 56 is closed.

A switch 57, normally biased to its circuit-closing position by a spring 58, is electrically included in series relation with the switch 54, and a similar switch 59, having an actuating spring 60, is electrically connected in series relation with the switch 56. A contact arm 61 is connected to the shaft of the worm gear 14, through a worm gear drive 62, and is moved toward the right or the left, depending upon the direction of rotation of the motor 17. The contact arm 61, when moved to its extreme left hand position, is arranged to open the switch 59 and, when moved to its extreme right hand position, is arranged to open the switch 57. The arrangement is such that the circuit of the electric motor 17 is interrupted whenever the control valve 13 has been actuated thereby to either its wide-open or closed position.

The operation of the equipment illustrated in Fig. 2 is as follows: As long as the electrical conductivity of the fluid between the electrodes 18 remains of a predetermined constant value, no change in the treatment process takes place. Upon a predetermined decrease or increase in the conductivity of the liquid between the testing electrodes 18, the Wheatstone bridge arrangement becomes unbalanced so that the moving contact 50 engages either the fixed contact 51 or the fixed contact 52, thereby energizing and closing either the switch 54 or 56. The electric motor 17 thereupon operates to open or close the valve 13 so as to effect the necessary change in the treatment process to bring the bridge arrangement again into balance, which is an indication that the end product is of the desired uniformity. In this manner, predetermined changes in the electrical conductivity of the fluid flowing past the testing electrodes 18 are employed to automatically effect the necessary changes in the treatment process to secure the desired uniformity.

Compensation for changes in the electrical conductivity of the fluid flowing past the testing electrodes 18 occasioned by changes in temperature of the fluid is secured by the combination of the thermally adjustable resistance 24 and the resistance 25. The resistances 24 and 25 are so proportioned that the changes in the resistance of the combination resulting from the action of the thermometer bulb 19 and spiral capillary spring 21 just compensate for changes in the electrical conductivity of the fluid between the electrodes 18, due to variations in the temperature of this fluid. The method of properly proportioning these resistances and of calibrating the same is as follows: Samples are tried and resistance ascertained at different temperatures. A curve is plotted. The magnitude of the resistance 25 is then determined so that the same temperature change is effected mechanically. The bridge is next adjusted so that contact is made at correct setting for a given temperature. Since temperature is thereafter correctly compensated for by the mechanical compensator, contact will be correctly made at any temperature. The range of the instrument is capable of any limits desired. Changing temperature coefficients even of unstable materials can thus be duplicated.

In the arrangement of Fig. 3, the thermally adjustable resistance 21 and the fixed resistance 25 are connected as one arm of the Wheatstone bridge. In other words, the resistances 21 and 25 are substituted for the resistance 40 of the arrangement of Fig. 2. The other elements in the control equipment may be arranged substantially the same as explained in connection with Fig. 2. It will be understood by those skilled in the art that various electrical combinations of the thermally adjustable resistance 21, resistance 25 and testing electrodes 18 may be resorted to without departing from the spirit of the invention, and I have herein illustrated and described three combinations of these elements merely by way of example and without any desire or intention of limiting the invention to these particular combinations.

Any appropriate thermal responsive device may be used for producing the compensating action. Thus, the thermometer bulb of the device illustrated in the drawings may contain mercury, spirit, or other appropriate thermal responsive agent and the communicating capillary openings of the tube 20 and the spring 21 may have any appropriate gas or vapor confined therein. In its broad aspect, the invention contemplates the use of any thermal responsive device adapted to produce a positive mechanical action in response to temperature changes, and in this specification I have described the mercury or vapor pressure thermometer as representative of a suitable device for the purposes of the invention and without any intention of limiting the invention to the particular device herein described and illustrated.

In Fig. 4 of the drawings, there is illustrated a modified form of the invention in which the desired mechanical action for effecting appropriate temperature compensation of the electrical conductivity of the component of the treatment process is obtained as the result of changes in the current flowing in an auxiliary electrical circuit thermally associated with the component. The same reference characters have been used in Fig. 4 to designate corresponding elements of the equipment hereinbefore described. In accordance with this modification of the invention, a resistance wire 64 of copper, nickel, or the like, is wound on an appropriate form, such as a strip of mica, and inclosed in a bulb 65. This bulb is inserted in the conduit 11 in proximity to the testing electrodes 18. The resistance element 65 is included in a series electric circuit containing an adjustable resistance 66 of manganin wire, a solenoid winding 67 and an appropriate source of electric energy 68. The magnetic core or plunger 69 of the solenoid is connected to one end of a pivoted arm or balance 70. A spring 71 is operatively attached to the other end of the balance 70. This end of the balance also carries a contact element 72 electrically associated with a resistance 73 of manganin wire. An adjustable resistance 74 of manganin wire is electrically connected in series relation with the resistance 73 and these two elements constitute one arm of the Wheatstone bridge arrangement.

The operation of the apparatus illustrated in Fig. 4 is as follows: As long as the temperature of the material flowing through the conduit 11 remains constant and of a predetermined normal value, the magnetizing action of the solenoid winding 67 is just balanced by the spring 71 and the contact member 72 engages the resistance 73 so as to include the normal amount of resistance in this arm of the Wheatstone bridge arrangement. Upon a change in the temperature of the material flowing through the conduit 11, the conductivity of the resistance element 65 is correspondingly affected, thereby altering the electric current flowing through the solenoid winding 67. As the result of this change in the current flowing through the winding 67, the contact member 72 is appropriately moved to include more or less of the resistance 73 in this arm of the Wheatstone bridge, thereby effecting the desired compensation of the electrical conductivity for changes in temperature of the material flowing through the conduit 11.

I claim:

1. The method of controlling a treatment process which comprises producing an action responsive to changes in the electrical conductivity of an appropriate component of the process, producing a second action responsive to changes in the temperature of said component, causing said second action to compensate said first action for changes in the electrical conductivity of said component occasioned by changes in the temperature thereof, and employing said first action thus compensated for temperature changes to effect the desired control of said process.

2. The method of automatically controlling a treatment process which comprises producing a continuing action responsive to changes in the electrical conductivity of an appropriate component of the process, producing a second continuing action responsive to changes in the temperature of said component, causing said second action to compensate said first action for changes in the electrical conductivity of said component occasioned by changes in the temperature thereof, and employing said first action thus compensated for temperature changes to automatically effect the desired control of said process.

3. In an apparatus for controlling a treatment process, the combination of means for producing an action responsive to changes in the electrical conductivity of an appropriate component of the treatment process, temperature responsive means thermally associated with said component, a movable member adapted to be actuated by said temperature responsive means, and means electrically associated with said conductivity responsive means and adapted to be operatively influenced by said member for effecting appropriate compensation of said action for changes in the electrical conductivity of said component occasioned by changes in the temperature thereof.

4. An apparatus for controlling a treatment process comprising in combination, means including coöperating electrodes electrically associated with an appropriate component of the process for producing an action responsive to changes in the electrical conductivity of the component, temperature responsive means thermally associated with said component, a movable member actuated by said temperature responsive means, electrical means associated with said member for compensating said action for changes in the electrical conductivity of said component occasioned by changes in the temperature thereof, and means for employing said action thus compensated for temperature changes to effect the desired control of said process.

5. An apparatus for indicating a treatment process comprising in combination, means including coöperating electrodes electrically associated with an appropriate component of the process for producing an action responsive to changes in the electrical conductivity of the component, a bulb thermometer thermally associated with said component, a spiral capillary spring in communication with said bulb and arranged to be actuated by changes in temperature of the component, a movable contact member operatively connected to said spring, a resistance adapted to be varied by the movement of said contact member electrically connected to said electrodes, a second resistance electrically connected to said electrodes and to said variable resistance so that changes in the conductivity of said component occasioned by changes in the temperature thereof are compensated by said two resistances, and means for employing said action thus compensated for temperature changes to effect the desired control of said process.

6. In apparatus for obtaining the electrical condition of a component of a treatment process, means for producing an action responsive to electrical variations in said component due to chemical changes therein, a thermal responsive non-electrolytic means for compensating said action for changes in the electrical conductivity of said component occasioned by changes in the temperature thereof, and a resistance member associated with said compensating means to adjust same to simulate such part of said conductivity changes in said component as is caused by temperature variations therein.

7. An apparatus for obtaining the condition of a component of a treatment process comprising in combination, means for producing an action responsive to changes in the electrical conductivity of an appropriate component of the process, means for setting up a second artificial action responsive to changes in the temperature of said component and simulating such part of the changes in the conductivity of said component as is due to temperature fluctuations therein, and means including a resistance member coöperating with said second means whereby said second action is caused to compensate said first action continuously.

8. An apparatus for obtaining the condition of a component of a treatment process comprising in combination, means for producing an action responsive to changes in the electrical conductivity of an appropriate component of the process, a variable resistance member comprising a compensator for said first action for changes in electrical conductivity of said component of said process occasioned by temperature variations therein, means to actuate said variable resistance member on the thermal power of said appropriate component, a coöperating resistance member for said variable resistance member, and means whereby said variable and coöperating resistance members are caused to simulate and compensate said first action for said temperature occasioned changes in the electrical conductivity of said component.

9. An apparatus for controlling a treatment process comprising means including a testing element and a compensating element for producing an action responsive to changes in the electrical conductivity of an appropriate component of the treatment process and independent of temperature changes of the component, said compensating element including a metallic resistance member and a coöperating variable metallic resistance and means to automatically vary said coöperating metallic resistance member.

In testimony whereof I affix my signature.

PHILIP E. EDELMAN.